(12) United States Patent
Arseneau

(10) Patent No.: US 7,115,880 B2
(45) Date of Patent: Oct. 3, 2006

(54) DIGITAL EVENT DETECTION IN A NUCLEAR IMAGING SYSTEM

(75) Inventor: Roger E. Arseneau, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 213 days.

(21) Appl. No.: 10/868,632

(22) Filed: Jun. 15, 2004

(65) Prior Publication Data

US 2005/0274891 A1 Dec. 15, 2005

(51) Int. Cl.
*G01T 1/00* (2006.01)

(52) U.S. Cl. ...................................... 250/395

(58) Field of Classification Search ................ 250/395; 327/335

See application file for complete search history.

(56) References Cited

U.S. PATENT DOCUMENTS 5,304,808 A * 4/1994 Odell ......................... 250/395
5,847,395 A * 12/1998 Malmin et al. ......... 250/363.07

* cited by examiner

*Primary Examiner*—Constantine Hannaher

(57) ABSTRACT

Digital detection of the occurrence of nuclear medicine radiation interaction events in a detector utilizes a digital energy signal sample to trigger signal processing of event signals from the detector by performing mathematical operations on the energy signal sample to determine the existence of a set of predetermined conditions that indicate the beginning of an interaction event in the detector.

21 Claims, 5 Drawing Sheets

EVENT WITH 100 NANOSECOND SEPARATIONS

EVENT WITH 50 NANOSECOND SEPARATIONS

DIGITAL EVENT DETECTION IN A NUCLEAR IMAGING SYSTEM

BACKGROUND OF THE INVENTION

1. Field of the Invention

The present invention generally relates to nuclear medicine, and systems for obtaining nuclear medicine images of a patient's body organs of interest. In particular, the present invention relates to a novel procedure and system for detecting the occurrence of valid scintillation events.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Emitted gamma photons are typically detected by placing a scintillator over the region of interest. Such scintillators are conventionally made of crystalline material such as NaI(Tl), which interacts with absorbed gamma photons to produce flashes of visible light. The light photons emitted from the scintillator crystal are in turn detected by photosensor devices that are optically coupled to the scintillator crystal, such as photomultiplier tubes. The photosensor devices convert the received light photons into electrical pulses whose magnitude corresponds to the amount of light photons impinging on the photosensitive area of the photosensor device.

Not all gamma interactions in a scintillator crystal can be used to construct an image of the target object. Some of the interactions may be caused by gamma photons that were scattered or changed in direction of travel from their original trajectory. Thus, one conventional method that has been used to test the validity of a scintillation event is to compare the total energy of the scintillation event against an energy "window" or range of expected energies for valid (i.e., unscattered) events. In order to obtain the total energy of the event, light pulse detection voltage signals generated from each photosensor device as a result of a single gamma interaction must be accurately integrated from the start of each pulse, and then added together to form an energy signal associated with a particular event. Energy signals falling within the predetermined energy window are considered to correspond to valid events, while energy signals falling outside of the energy window are considered to correspond to scattered, or invalid, events, and the associated event is consequently not used in the construction of the radiation image, but is discarded. Without accurate detection of the start of an event, the total energy value may not be accurate, which would cause the signal to fall outside of the energy window and thereby undesirably discard a useful valid event.

Another instance of inaccurate information may arise when two gamma photons interact with the scintillation crystal within a time interval that is shorter than the time resolution of the system (in other words the amount of time required for a light event to decay sufficiently such that the system can process a subsequent light event as an independent event), such that light events from the two gamma interactions are said to "pile up," or be superposed on each other. The signal resulting from a pulse pile-up would be meaningless, as it would not be possible to know whether the pulse resulted from two valid events, two invalid events, or one valid event and one invalid event.

Different solutions to the pulse pile-up problem are known in the prior art. One such solution involves the use of pile-up rejection circuitry, which either precludes the detector from processing any new pulses before processing has been completed on a prior pulse, or stops all processing when a pile-up condition has been identified. This technique addresses the problem of post-pulse pile-up, wherein a subsequent pulse occurs before processing of a pulse of interest is completed. Such rejection circuitry, however, may undesirably increase the "deadtime" of the imaging system, during which valid gamma events are being received but are not able to be processed, thereby undesirably increasing the amount of time needed to complete an imaging procedure.

Another known technique addresses the problem of pre-pulse pile-up, wherein a pulse of interest is overlapped by the trailing edge or tail of a preceding pulse. This technique uses an approximation of the preceding pulse tail to correct the subsequent pulse of interest. Such approximation is less than optimal because it is not accurate over the entire possible range of pile-up conditions. Further, it requires knowledge as to the precise time of occurrence of the preceding pulse, which is difficult to obtain using analog signals. Additionally, this technique consumes a large amount of computational capacity.

Yet another problem encountered in the conventional detection and processing of valid light events is the effect of signal noise on accurate event location processing. In particular, direct current (DC) drifts or other sources of noise may alter the signals from the photosensor devices significantly enough to cause the calculation of the spatial location of an event to be unacceptably inaccurate.

A known prior art solution to this problem is disclosed in commonly assigned U.S. Pat. No. 5,847,395, incorporated by reference herein in its entirety. The '395 patent discloses the use of a flash analog-to-digital converter (FADC) associated with each photosensor device (e.q., photomultiplier tube (PMT)) and a data processor that integrates the FADC output signals, generates a fraction of a running sum of output signals, and subtracts the fraction from the integrated output signals to generate an adjustment signal to correct the output signals for baseline drifts. However, this solution does not address the pile-up problem as it is concerned with energy-independent locational computation.

Therefore, there exists a need in the art for a solution that eliminates the effects of system and event-related noise as well as addresses the problem of pulse pile-up.

SUMMARY OF THE INVENTION

The present invention solves the existing need according to a first aspect by providing a method of determining the start time of a gamma interaction in a nuclear imaging detector, including the steps of obtaining a digital sample of an energy signal from a nuclear imaging detector, calculating a second derivative of the digital sample, determining when the second derivative has returned to zero after first reaching a maximum value, and upon determination that the second derivative has returned to zero, triggering an event start signal that initiates signal processing of signals from the nuclear imaging detector.

According to another aspect of the invention, a computer program product is provided, including a computer-readable storage medium containing computer-executable instructions stored thereon, including computer-executable instructions for obtaining a digital sample of an energy signal from a nuclear imaging detector, calculating a second derivative of the digital sample, determining when the second derivative has returned to zero after first reaching a maximum value, and upon determination that the second derivative has returned to zero, triggering an event start signal that initiates signal processing of signals from the nuclear imaging detector.

According to yet another aspect of the invention, a circuit for determining the start time of a gamma interaction in a nuclear imaging detector is provided, which includes circuitry for obtaining a digital sample of an energy signal from a nuclear imaging detector, circuitry for calculating a second derivative of the digital sample, circuitry for determining when the second derivative has returned to zero after first reaching a maximum value, and circuitry for triggering an event start signal that initiates signal processing of signals from the nuclear imaging detector, upon determination that the second derivative has returned to zero.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
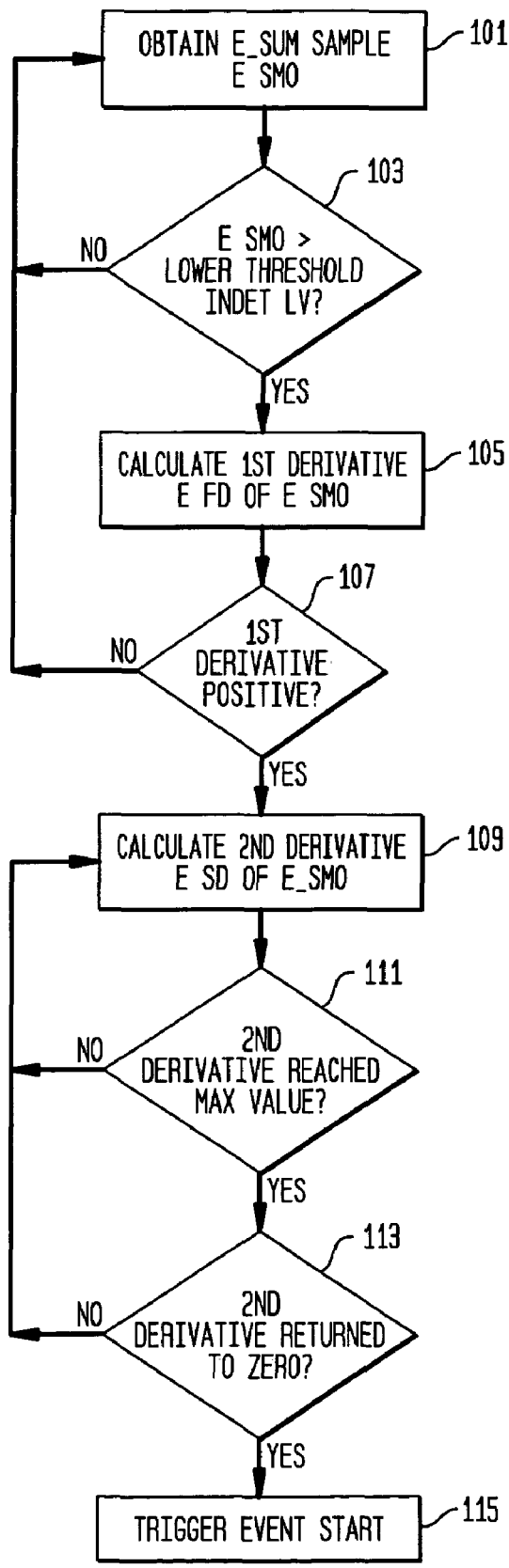
FIG. 1 is a flow chart diagram of a method of digital event detection according to one preferred embodiment of the invention.

Referring to FIG. 1, according to one preferred embodiment of the invention, a method for detecting the occurrence of a light event is disclosed. The method involves the use of a digital energy signal E_SUM to detect the start of a light event in a scintillator. Such digital energy signal E_SUM is readily obtainable by connecting all of the outputs of the photosensor devices of the system to a summing amplifier, and feeding the output of the summing amplifier to a FADC as disclosed in the aforementioned '395 patent. Accordingly, no further description of the E_SUM signal will be made, other than to note that in accordance with a preferred embodiment of the invention, the digital E_SUM signal outputted from the FADC is a 10-bit signal sampled at a rate of 240 MHz.

Figure 2:
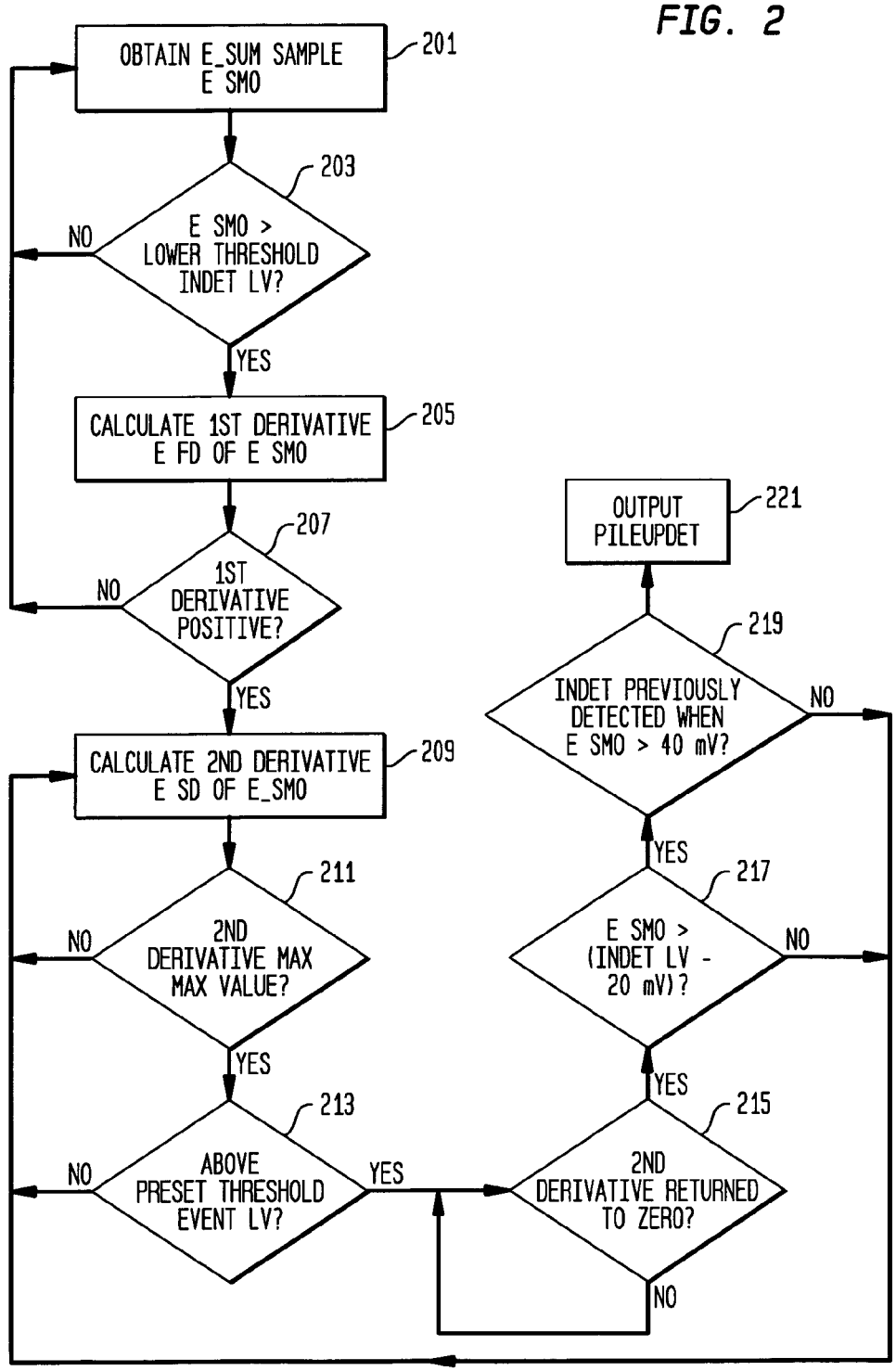
FIG. 2 is a flow chart diagram of a method of digital event detection according to a second preferred embodiment of the invention.
Figure 3:
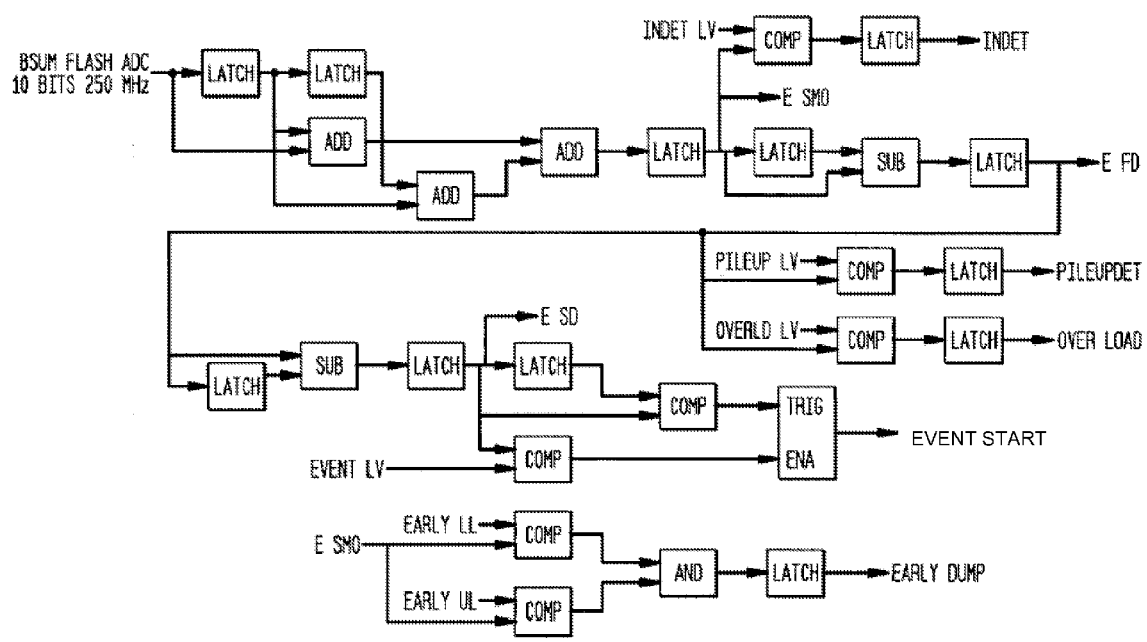
FIG. 3 is a block diagram of one example of a circuit that executes the methods according to the present invention.

It is further noted that the method as shown in FIGS. 1 and 2 may be implemented in a number of different ways, such as by software, firmware, digital signal processing (DSP) or a hard-wired digital logic circuit as shown in FIG. 3, which is illustrated for purposes of explanation and exemplification only, and is not intended to restrict the scope of the present invention.

As shown in FIG. 1, at step 101, a sample E SMO of the instantaneous E_SUM signal is obtained. The sample E SMO according to the implementation embodiment shown in FIG. 3 is the sum of three successive output values of the FADC, which may be further processed by averaging, filtering or the like. Alternatively, E SMO may be only the instantaneous output of the FADC.

At step 103, E SMO is compared with a preselected reference value, INDET LV (see FIG. 3), that is greater than the value of E_SUM from the photosensor devices when no light event is present, in order to distinguish the signal from the baseline of the photosensor devices. If E SMO is not greater than the reference value INDET LV, no event is considered to be present and processing returns to obtain the next E SMO sample.

If E SMO is greater than the reference value, then at step 105 the first derivative of E SMO is calculated (E FD in FIG. 3). If the first derivative is positive (indicating that E SMO is rising) as determined at step 107, then processing advances to step 109 where the second derivative of E SMO is calculated (E SD in FIG. 3). If the first derivative is not positive, processing returns to obtain the next sample E_SUM signal. At step 111, it is determined whether the second derivative E SD of sample E SMO has reached a maximum or peak value. This can be determined by comparing the instant second derivative value with the immediately preceding value, which can be stored in a buffer. If not, the process returns to step 109 to calculate the next second derivative value.

If it is determined at step 111 that the second derivative E SD has reached its peak or maximum value, then at step 113 it is determined whether the second derivative E SD has returned to zero. If not, processing returns to step 109. If so, then at step 115 an "event start" trigger signal is enabled (see "EVENT START" in FIG. 3), which accurately indicates the start time of a light event. The "event start" signal can be used to initiate further signal processing of the output signals from the photosensor devices for image construction. The method of digital detection of the start time of a light event as just described provides significantly better accuracy than the conventional analog method where an "event start" signal is simply triggered when the energy signal reaches a predetermined value, such as 40 mV.

FIG. 2 is a flow diagram of a second preferred embodiment of the invention, wherein a method is disclosed for detecting the occurrence of a light event during the time that a previous event is still present in the E_SUM signal (in other words, in a pulse pile-up situation).

At step 201, a sample E SMO of the instantaneous E_SUM signal is obtained. The sample E SMO according to the implementation embodiment shown in FIG. 3 is the sum of three successive output values of the FADC, which may be further processed by averaging, filtering or the like. Alternatively, E SMO may be only the instantaneous output of the FADC.

At step 203, E SMO is compared with a preselected reference value, INDET LV (see FIG. 3), that is greater than the value of E_SUM from the photosensor devices when no light event is present, in order to distinguish the signal from the baseline of the photosensor devices. If E SMO is not greater than the reference value INDET LV, no event is considered to be present and processing returns to obtain the next E SMO sample.

If E SMO is greater than the reference value, then at step 205 the first derivative of E SMO is calculated (E FD in FIG. 3). If the first derivative is positive (indicating that E SMO is rising) as determined at step 207, then processing advances to step 209 where the second derivative of E SMO is calculated (E SD in FIG. 3). If the first derivative is not positive, processing returns to obtain the next sample E_SUM signal. At step 211, it is determined whether the second derivative E SD of sample E SMO has reached a maximum or peak value.

If not, processing returns to step 209. If so, processing advances to step 213 where it is determined if the second derivative E SD is still above a predetermined threshold value EVENT LV (see FIG. 3) to avoid false triggering of the detector in response to noise. If the second derivative E SD is not above this threshold, then processing returns to step 209. If E SD is above the preset threshold value, then at step 215 it is determined when the second derivative has returned to zero. Once it has been determined that the second derivative E SD has returned to zero, then at step 217 it is determined whether the sample E SMO is not less than 20 mV below the threshold value INDET LV indicative of no event being present. If not, processing returns to step 209. If so, then at step 219 it is determined whether an INDET signal was previously generated when the E SMO signal was above a predetermined value, such as 40 mV. If not, processing returns to step 209. If so, then a pulse pile-up detection signal PILEUPDET is produced at step 221 (see FIG. 3). It is noted that when the results of steps 217 and 219 are negative, this indicates that there is no pulse pile-up condition and an EVENT START signal would be triggered in conjunction with the return to step 209, similar to step 115 in FIG. 1.

FIG. 3 is a general block diagram of a logic circuit according one preferred implementation of the method according to the invention. As shown, the circuit is constructed of a logical connection of latch circuits, adders, subtracters, and comparators, which receive the input signal E_SUM and the various reference values. The combination of comparators, AND gate and latch at the bottom of FIG. 3 is a circuit for determining whether the sample E SMO is outside of an acceptable energy range or window bounded by values EARLY LL and EARLY UL. If E SMO is outside of the energy window, then a DUMP signal is generated that causes the detector to discard the present E SMO value and to restart processing.

Figure 4A:
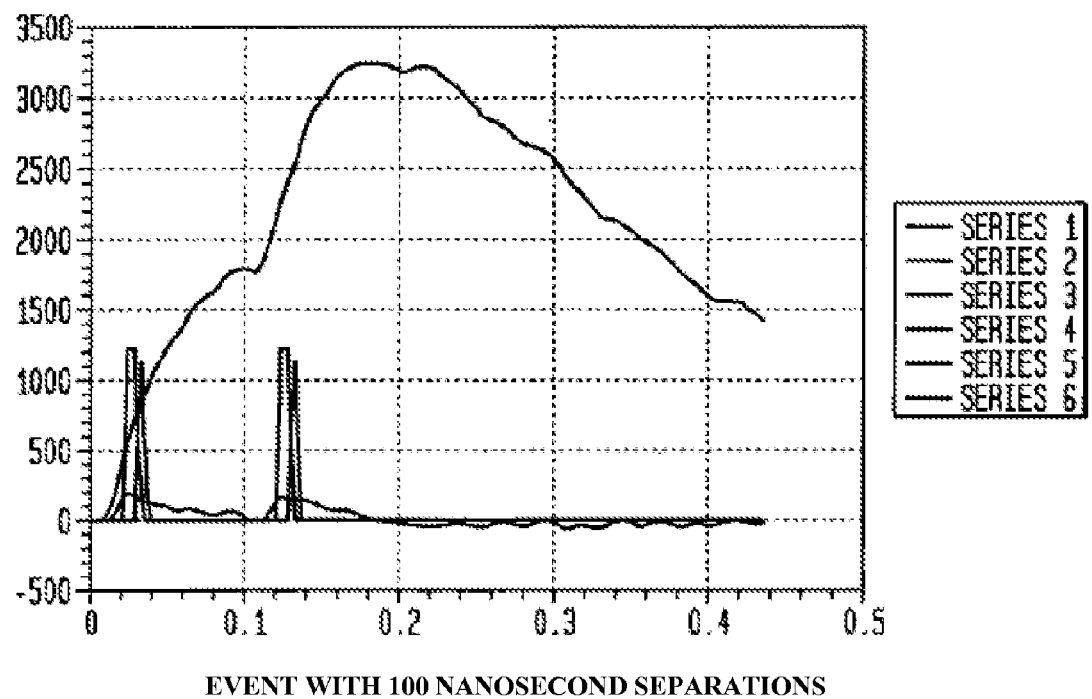
FIGS. 4A–4C are charts illustrating detection of pile-up events using the methods of the present invention.
Figure 4B:
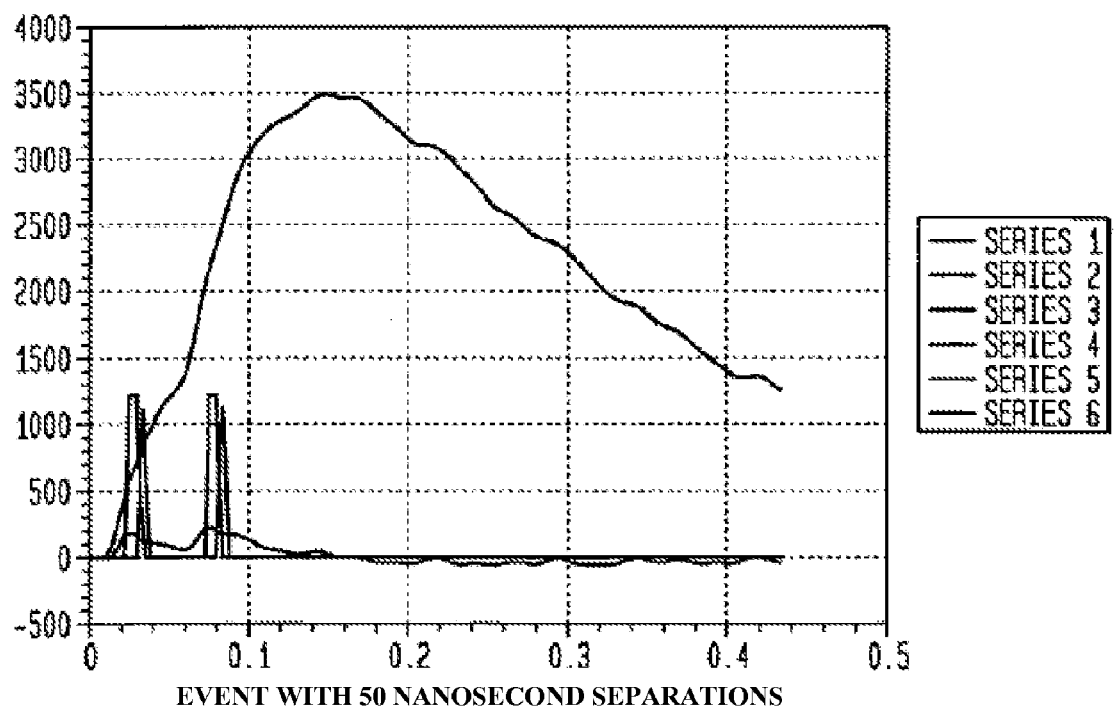
Figure 4C:
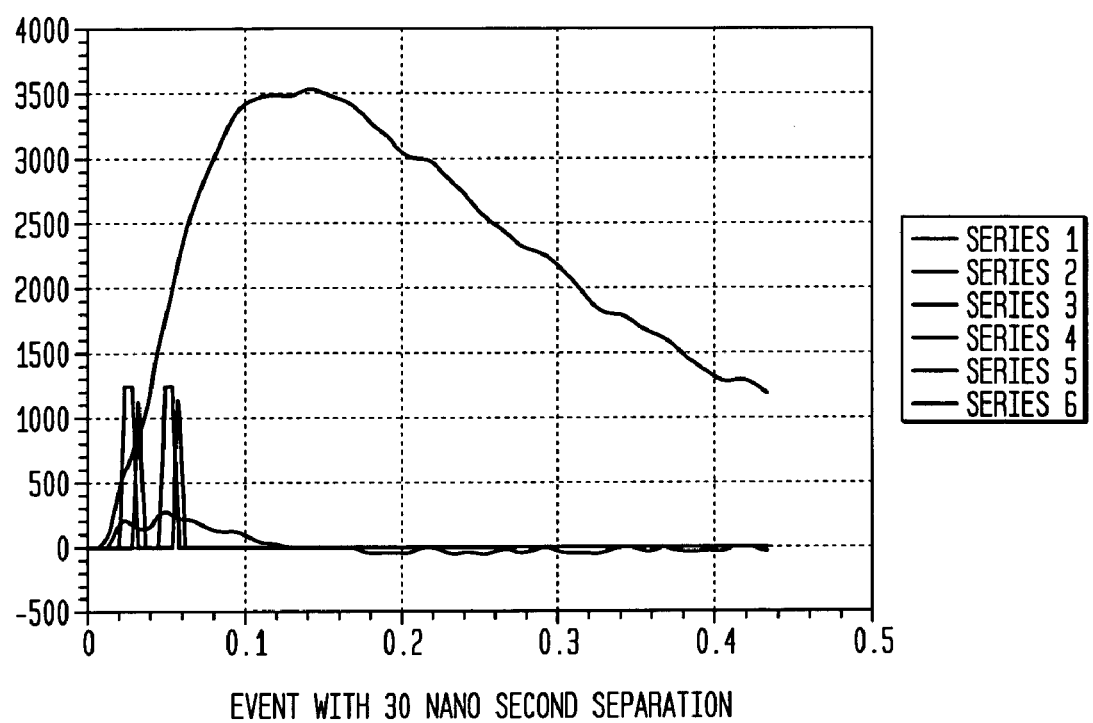

FIGS. 4A—4C are graphs of various experimental runs of the inventive method, illustrating the ability of a detector system according to the present invention to resolve separate events with separations as short as 30 nanoseconds.

The invention having been described, it will be apparent to those skilled in the art that the same may be varied in many ways without departing from the spirit and scope of the invention. In particular, while the invention has been described with reference to photomultiplier tube photosensor devices, the inventive concept does not depend upon the use of PMTs and any acceptable photosensor device may be used in place of a PMT. Further, any suitable gamma detector may be used in place of a scintillation crystal. Finally, the circuit of FIG. 3 is but one example of an implementation of the invention. As previously explained the digital event detection may be performed by a programmable computer loaded with a software program, firmware, ASIC chip, DSP chip or hardwired digital circuit. Any and all such modifications are intended to be included within the scope of the following claims.

What is claimed is:

1. A method of determining the start time of a gamma interaction in a nuclear imaging detector, comprising the steps of:

obtaining a digital sample of an energy signal from said nuclear imaging detector;

calculating a second derivative of said digital sample;

determining when said second derivative has returned to zero after first reaching a maximum value; and upon determination that said second derivative has returned to zero, triggering an event start signal that initiates signal processing of signals from said nuclear imaging detector.

2. The method of claim 1, further comprising the step of determining whether said digital sample exceeds a first predetermined threshold prior to calculating said second derivative.

3. The method of claim 1, further comprising the steps of calculating a first derivative of said digital sample and determining whether said first derivative is positive prior to calculating said second derivative.

4. The method of claim 1, wherein said obtaining step comprises the step of summing a preselected number of successive outputs of an analog-to-digital converter coupled to outputs of photosensors of said nuclear imaging detector.

5. A method of determining the start time of a gamma interaction in a nuclear imaging detector, comprising the steps of:

obtaining a digital sample of an energy signal from said nuclear imaging detector; calculating a second derivative of said digital sample;

determining when said second derivative has returned to zero after first reaching a maximum value;

upon determination that said second derivative has returned to zero, triggering an event start signal that initiates signal processing of signals from said nuclear imaging detector, determining whether a value of said sample is greater than a first preselected value, determining whether an event signal was previously generated when a value of said sample was greater than a second preselected value, and triggering output of a pulse pile-up detection signal when results of said last two determining steps are affirmative.

6. The method of claim 5, further comprising the step of determining whether said digital sample exceeds a first predetermined threshold prior to calculating said second derivative.

7. The method of claim 5, further comprising the steps of calculating a first derivative of said digital sample and determining whether said first derivative is positive prior to calculating said second derivative.

8. The method of claim 5, wherein said obtaining step comprises the step of summing a preselected number of successive outputs of an analog-to-digital converter coupled to outputs of photosensors of said nuclear imaging detector.

9. A computer program product comprising a computer-readable storage medium containing computer-executable instructions stored thereon, including computer-executable instructions for:

obtaining a digital sample of an energy signal from a nuclear imaging detector; calculating a second derivative of said digital sample;

determining when said second derivative has returned to zero after first reaching a maximum value; and upon determination that said second derivative has returned to zero, triggering an event start signal that initiates signal processing of signals from said nuclear imaging detector.

10. The computer program product of claim 9, wherein said storage medium further comprises computer-executable instructions for:

subsequent to said second derivative having returned to zero, determining whether a value of said sample is greater than a first preselected value, determining whether an event signal was previously generated when a value of said sample was greater than a second preselected value, and triggering output of a pulse pile-up detection signal when results of said last two determining steps are affirmative.

11. The computer program product of claim 9, wherein said storage medium further comprises computer-executable instructions for determining whether said digital sample exceeds a first predetermined threshold prior to calculating said second derivative.

12. The computer program product of claim 9, wherein said storage medium further comprises computer-executable instructions for calculating a first derivative of said digital sample and determining whether said first derivative is positive prior to calculating said second derivative.

13. The computer program product of claim 9, wherein said instructions for obtaining comprise an instruction for summing a preselected number of successive outputs of an analog-to-digital converter coupled to outputs of photosensors of said nuclear imaging detector.

14. A circuit for determining the start time of a gamma interaction in a nuclear imaging detector, comprising:
means for obtaining a digital sample of an energy signal from a nuclear imaging detector;
means for calculating a second derivative of said digital sample;
means for determining when said second derivative has returned to zero after first reaching a maximum value; and
means for triggering an event start signal that initiates signal processing of signals from said nuclear imaging detector, upon determination that said second derivative has returned to zero.

15. The circuit of claim 14, further comprising:
means for determining, subsequent to said second derivative having returned to zero, whether a value of said sample is greater than a first preselected value;
means for determining subsequent to said second derivative having returned to zero, whether an event signal was previously generated when a value of said sample was greater than a second preselected value; and
means for triggering output of a pulse pile-up detection signal when results of said last two determinations are affirmative.

16. The circuit of claim 14, further comprising:
means for determining whether said digital sample exceeds a first predetermined threshold prior to calculating said second derivative.

17. The circuit of claim 14, further comprising:
means for calculating a first derivative of said digital sample and determining whether said first derivative is positive prior to calculating said second derivative.

18. The circuit of claim 14, wherein said means for obtaining comprises means for summing a preselected number of successive outputs of an analog-to-digital converter coupled to outputs of photosensors of said nuclear imaging detector.

19. A method of determining the start time of a gamma interaction in a nuclear imaging detector, comprising the steps of:
obtaining a digital sample of an energy signal from said nuclear imaging detector;
performing a sequence of predetermined mathematical operations on said digital sample; and
upon determination that results of said sequence of operations meet a set of one or more preselected conditions, triggering an event start signal that indicates the start time of said gamma interaction and initiates signal processing of signals from said nuclear imaging detector.

20. A method of determining the start time of a gamma interaction in a nuclear imaging detector, comprising the steps of:
obtaining a digital sample of an energy signal from said nuclear imaging detector;
comparing said digital sample with a predetermined threshold value;
if said digital sample exceeds said predetermined threshold value, performing a sequence of predetermined mathematical operations on said digital sample; and
upon determination that results of said sequence of operations meet a set of one or more preselected conditions, triggering an event start signal that initiates signal processing of signals from said nuclear imaging detector.

21. A method according to claim 20, wherein said predetermined threshold value corresponds to a baseline of said nuclear imaging detector.

* * * * *